3,098,792
PROCESS FOR PREPARING PRODUCT HAVING ENHANCED LACTOGENIC ACTIVITY
Ralph A. Reisfeld, Scotch Plains, and George L. Tong, Elizabeth, N.J., assignors to Merck & Co., Inc., Rahway, N.J., a corporation of New Jersey
No Drawing. Filed Mar. 31, 1961, Ser. No. 99,674
1 Claim. (Cl. 167—74)

This invention relates to a product having enhanced lactogenic activity and methods of preparing this product. More particularly, it is concerned with the isolation in substantially pure form of a major component of sheep prolactin having markedly greater biological activity than was heretofore obtainable.

The hormone known as ovine prolactin plays an important role in the initiation and maintenance of normal or augmented milk production in mammals and is also involved in fat and carbohydrate metabolism. The available prolactin preparations obtained from sheep pituitaries contains at least three distinct fractions, one major and two minor components as determined by electrophoresis and column chromatography.

It is an object of the present invention to provide a product having enhanced lactogenic activity and methods for its preparation. Another object is to provide a method of isolating the components present in sheep prolactin preparations now available. Other objects will be apparent from the detailed description of this invention hereinafter provided.

In accordance with the present invention, it is now found that a product having enhanced lactogenic activity can be prepared from prolactin preparations obtained from sheep pituitaries. Such preparations have been shown to contain three distinct components as determined by electrophoresis.

Pursuant to one embodiment of the present invention, it is now found that the components of sheep prolactin can be separated and recovered by chromatographic procedures. Thus, by passing a solution of the multi-component prolactin preparation through a column of diethylaminoethyl cellulose and then eluting the column with suitable buffer solutions, it is possible to recover fractions of eluate containing only two of the original components. By repeating the chromatography with the two component fractions, the individual components can be recovered.

The following example illustrates a method of the present invention for separating the major components of sheep prolactin.

EXAMPLE

One gram of prolactin prepared in accordance with procedures described in the prior art and containing three electrophoretic components is dissolved in 10 ml. of "Tris-EDTA-Borate" buffer having a pH of 9.0 and an ionic strength of 0.05. This buffer has the following composition: 0.017 M tris(hydroxymethyl) aminomethane ("Tris"), 0.005 M (ethylenedinitrilo)tetraacetic acid disodium salt ("EDTA"), 0.023 M boric acid and 0.017 M sodium hydroxide. The resulting solution is placed on a column of diethylaminoethyl cellulose which had been previously equilibrated with the same "Tris-EDTA-borate" buffer described above; the sample being allowed to enter the column by gravity flow. The column was then eluted with an eluant which was pumped through the column at a rate of 2.5 ml. per minute from a variable gradient mixer described by Peterson and Sober (Anal. Chem., 31, 857 (1959)). The eluant used was "Tris-EDTA-Borate" buffer of 0.15 ionic strength and pH 9 consisting of 0.05 M Tris, 0.016 M EDTA, 0.069 M boric acid and 0.05 M sodium hydroxide. The volume fraction of this buffer placed in each of the 9 chambers of the gradient device was as follows: 0.26, 0.33, 0.33, 0.33, 0.33, 0.33, 0.33, 1.0, 1.0. The last two chambers contained 0.3 M and 1.35 M sodium chloride respectively in addition to the buffer. Each chamber contained 100 ml. of eluant.

Five ml. fractions of eluant were collected every two minutes and their respective protein concentration was estimated by absorption at 280 m$\mu$. The progress of fractionation was followed by analysis of combined fractions of eluant comprising a chromatographic peak or peaks by electrophoresis on filter paper strips employing a Tris-EDTA-borate buffer at pH 9.0 and 0.05 ionic strength. The three components originally present in the prolactin preparation were called [I], [II], and [III] in order of increasing electrophoretic mobility. The content of fractions 40–90 was essentially 90% component [I] and 10% component [II]. Fractions 91–110 contained about 40% component [I] and 60% component [II]. Fractions 111–130 consisted of a mixture of about 10% component [I], 80% component [II] and 10% component [III]. Fractions 131–150 contained about 60% component [II] and 40% component [III], and fractions 151–175 contained about 35% component [II] and 65% component [III].

Fractions 40–90 were dialyzed against deionized water and then freeze dried. The resulting material was then rechromatographed under the identical conditions described above. The material contained in fractions 40–100 was essentially 95% component [I] with a small amount (5% or less) of component [II] being present.

Component [I] when subjected to moving boundary electrophoresis had a mobility of $+0.62 \times 10^{-5}$ cm.$^2$ sec.$^{-1}$ volt$^{-1}$ at pH 5.58; $0.42 \times 10^{-5}$ cm.$^2$ sec.$^{-1}$ volt$^{-1}$ at pH 6.02 and $-1.72 \times 10^{-5}$ cm.$^2$ sec.$^{-1}$ volt$^{-1}$ at pH 5.79.

Component [I] behaved as a homogeneous protein in free boundary electrophoresis with an electrophoretic mobility of $3.80 \times 10^{-5}$ cm.$^2$ sec.$^{-1}$ volt$^{-1}$ in glycine-NaOH buffer, pH 10, $\Gamma/2=0.1$. The sedimentation constant in this same buffer was found to be 2.18S with the sample sedimenting as a single, sharp symmetrical boundary. The isoelectric point of component [I], as determined by free boundary electrophoresis, was pH 5.75. The N-terminal amino acid was found to be threonine by the fluorodinitrobenzene and by the phenylisothiocyanate methods. The number of moles of N-terminal threonine per mole of prolactin (M.W. about 25,000) was found to be unity, after suitable corrections had been made for the partial destruction of this amino acid during hydrolysis. The C-terminal amino acid of component [I] was found to be cysteine. When performic acid-oxidized component [I] was reacted with fluorodinitrobenzene, the only dinitrophenylated α-amino group found was threonine, while treatment with carboxypeptidase revealed cysteic acid at the C-terminal. Performic acid-oxidized component [I] sedimented as a single, sharp boundary during ultracentrifugation.

The prolactin composition used as the starting material in the above-described example was prepared by the following procedures.

Sheep pituitary glands (1 kg.) were washed with water, frozen and then ground in a meat grinder. The ground glands were then extracted with four liters of acetone to which was added 100 ml. of concentrated hydrochloric acid. The acetone extract was separated from the insoluble material, diluted with four volumes of acetone and allowed to stand overnight. The insoluble material which separated was dissolved in aqueous acetone and the resulting solution freeze-dried to produce about 17 g. of product. This product was dissolved in 900 ml. of water adjusted to pH 3.0 with hydrochloric acid and centrifuged to remove the insoluble portion. To the resulting solution was added about 60 ml. of saturated sodium chloride solution. After standing at 3° C. overnight, the insoluble portion was recovered and dissolved in 300 ml. of water adjusted to pH 9.0 with sodium hydroxide. The solution was then adjusted to pH 6.3 with hydrochloric acid and centrifuged to remove the insoluble portion. The solution was then adjusted to pH 5.6 with hydrochloric acid and allowed to stand at 3° C. The precipitated material was recovered by centrifugation, dissolved in water, and the aqueous solution freeze dried to obtain the prolactin composition.

Component [I] prepared by the procedures described above was much more active biologically than components [II] and [III] of the original prolactin preparation as determined by lactogenic activity and "growth hormone-like" activity.

The lactogenic activity of component [I], the starting material and a mixture of components [II] and [III] were determined by intramuscular injection of these materials into crop sacs of white Carneaux pigeons in accordance with the assay method of Riddle, Bates and Dykshorn described in American Journal of Physiology, volume 105, pp. 191–216 (1933). The activitiees of the tested preparations were found to be as follows.

Preparation: Lactogenic activity, I.U./mg.
  Starting material (3 components) _____ 15
  Component [I] _____ 35
  Components [II] and [III] _____ 10

The "growth hormone-like" activity was ascertained for these preparations by determination of the net increase in body weights of plateaued female rats during a period of 10 days using the procedure of Marx et al. (Endocrinology, 30, 1 (1942)). The results of this assay were as follows:

| Preparation | "Growth hormone-like" activity | |
| --- | --- | --- |
| | Total dose, mg. | Net change in body weight (g.) |
| Starting material (3 components) | 0.75 | +4 |
| Component [I] | 0.75 | +15 |
| Components [II] and [III] | 0.75 | −1 |

The growth hormone-like activity of component [I] was shown by the effect of this product on plasma non-esterified fatty acids (NEFA) levels in dogs. These tests were carried out as follows:

Three trained Beagle female dogs were fasted overnight. Early the next morning they were injected intraperitoneally with the indicated preparations. At intervals, blood samples were withdrawn from the jugular vein into heparinized syringes and the plasma obtained by centrifugation of the red blood cells. Non-esterified fatty acid (NEFA) levels were determined by the method of Dole [J. Clin. Invest. 35, 150, (1956)]. The results of these tests were as follows:

Control

| Time (Hrs.) | Dog 1808 | Dog 1818 | Dog 1978 |
| --- | --- | --- | --- |
| | $\mu eq./l.$ | $\mu eq./l.$ | $\mu eq./l.$ |
| 0 | 888 | 959 | 994 |
| 2 | 888 | 852 | 959 |
| 4 | 888 | 817 | 959 |
| 6 | 888 | 923 | 888 |
| 7 | 888 | 959 | 1,207 |

COMPONENT [I] (L–585,029)

| | 1 mg./kg. | 2 mg./kg. | 2 mg./kg. |
| --- | --- | --- | --- |
| | $\mu eq./l.$ | $\mu eq./l.$ | $\mu eq./l.$ |
| 0 | 686 | 876 | 838 |
| 2 | 800 | 876 | 1,067 |
| 4 | 914 | 1,029 | 724 |
| 6 | 1,219 | 1,295 | 2,019 |
| 7.5 | 1,105 | 1,334 | 2,019 |

BOVINE GROWTH HORMONE (BGH–264-160)

| | 1 mg./kg. | 2 mg./kg. | 2 mg./kg. |
| --- | --- | --- | --- |
| | $\mu eq./l.$ | $\mu eq./l.$ | $\mu eq./l.$ |
| 0 | 960 | 926 | 686 |
| 2 | 755 | 823 | 789 |
| 4 | 1,303 | 960 | 823 |
| 6 | 1,544 | 1,063 | 1,646 |
| 7.5 | 1,303 | 1,098 | 1,784 |

The product having enhanced lactogenic activity obtained in accordance with the present invention can be used for the maintenance of lactation in rabbits and rats for breeding purposes. Also, it can be used to increase the broodiness in hens.

Various changes and modifications of the invention can be made and, to the extent that such variations incorporate the spirit of this invention, they are intended to be included within the scope of the appended claim.

What is claimed is:

A process for the preparation of a product having enhanced lactogenic activity which comprises subjecting a multicomponent prolactin composition derived from sheep pituitary glands to chromatography over (diethylaminoethyl)-cellulose, eluting said cellulose with tris-(hydroxymethyl) - aminomethane - (ethylenedinitrilo) - tetraacetic acid-borate buffer, collecting separate small fractions of the resulting eluate which exhibit substantial absorption of ultraviolet light having a wavelength of 280 m$\mu$, combining the eluate fractions having as a major constituent a protein having an electrophoretic mobility of about $3.80 \times 10^{-5}$ cm.$^2$ sec.$^{-1}$ volt$^{-1}$ in glycine-sodium hydroxide buffer at pH 10 and as a minor constituent a protein having a higher electrophoretic mobility than $3.80 \times 10^{-5}$ cm.$^2$ sec.$^{-1}$ volt$^{-1}$ in glycine-sodium hydroxide buffer at pH 10 to form a first combined eluate fraction, recovering as a mixture said major and said minor constituents from said first combined eluate fraction, subjecting said mixture to rechromatography over (diethylaminoethyl) cellulose, combining rechromatography eluate fractions having substantial ultraviolet absorption at a wavelength of 280 m$\mu$ and having as the substantially sole constituent a protein having an electrophoretic mobility of $3.80 \times 10^{-5}$ cm.$^2$ sec.$^{-1}$ volt$^{-1}$ in clycine-sodium hydroxide buffer at pH 10 to form a second combined eluate fraction and recovering said protein from said second combined eluate fraction.

References Cited in the file of this patent

Pincus: The Hormones, vol. 1, 1948, Academic Press Inc., New York, New York, pp. 648 and 652–656.

Cole: Archives of Biochemistry and Biophysics, vol. 78, 1958, pp. 392–400.